United States Patent Office 3,733,218
Patented May 15, 1973

3,733,218
REMOVAL OF SOLDER FLUX WITH AZEOTROPIC SOLVENT MIXTURES

Cary A. Begun, Mentor, Ohio, assignor to Diamond Shamrock Corporation, Cleveland, Ohio
Filed Nov. 15, 1971, Ser. No. 198,776
Int. Cl. B08b *7/00;* B01f *1/00*
U.S. Cl. 134—38 9 Claims

ABSTRACT OF THE DISCLOSURE

Azeotropic mixtures of trichloroethylene/isobutanol, perchlorethylene/cyclopentanol, perchlorethylene/ethylene glycol monoethyl ether or perchlorethylene/n-amyl alcohol are used to remove the residual rosin-based solder flux from soldered printed circuit boards.

BACKGROUND OF THE INVENTION

In the electronics industry it is common practice to coat printed circuit boards with rosin-based fluxes prior to soldering the electronic components thereon. After the soldering operation, in order to eliminate degradation of electrical properties and for aesthetic reasons, the residual flux material must be removed. Common practice is to remove this flux with a solvent. However, since the most widely used rosin fluxes contain a number of ingredients in addition to the primary component, abietic acid, such as activators, for example, high molecular weight fatty acids or amine hydrochlorides, a single solvent often proves inadequate. For example, while a non-polar solvent is capable of efficiently removing the rosin, a film, apparently of more polar materials, often remains on the circuit board. It is this film which, over a period of time, can ionize resulting in adverse effects on the electrical properties of the circuit. For this reason, attempts have been made to formulate solvent mixtures, the individual components of which complement each other in their cleaning action. Conventional solvent mixtures, however, in addition to their often ineffective cleaning abilities, are subject to preferential evaporation of their more volatile components, resulting in a mixture of changed composition, usually with a detrimental effect on performance.

Somewhat more recently a number of binary and even tertiary azeotropic systems have been suggested for use in this area, such systems having the obvious advantage of uniformity of composition and ease of recovery, However, even these azeotropes are often unsuccessful in removing the more polar constituents of the rosin flux, again resulting in a residual film on the board. Further objections to many of these prior art azeotropes are their use of various chloro-fluoro organics which are considerably more expensive than the chlorinated aliphatics and are not always as effective in their solvency.

STATEMENT OF THE INVENTION

Therefore it is an object of the present invention to provide a method for the complete and efficient removal of rosin-based solder fluxes from printed circuit boards.

This and further objects of the present invention will become apparent to those skilled in the art from the specification and claims which follow.

There has now been found a method of removing rosin-based solder fluxes from soldered printed circuit boards, which method consists essentially of contacting said boards with an azeotropic mixture selected from the group consisting of about 91:5 percent trichlorethylene/8.5 percent isobutanol, about 91 percent perchlorethylene/9 percent cyclopentanol, about 82.9 percent perchlorethylene/17.1 percent ethylene glycol monoethyl ether and about 86.1 percent perchlorethylene/13.9 percent n-amyl alcohol, all percents by weight. Such a method has the advantage of the low cost, ready availability and excellent solvency of non-polar trichlorethylene and perchlorethylene while incorporating in an azeotropic form, with the advantages that follow therefrom, relatively large amounts of polar solvents of the alcohol type, the cooperative and perhaps synergistic effect of which solvents is the complete removal of all components of the solder flux from the printed circuit boards. Obviously, as mentioned above, the azeotropic nature of the mixtures leads to consistency of formulation and activity, as well as to an ease of recovery once the solvent bath becomes saturated with dissolved flux materials.

DESCRIPTION OF THE PREFERRED EMBODIMENTS

The first of the azeotropes useful in the method of the present invention is that of trichlorethylene with isobutanol. At substantially atmospheric pressures (760 mm. Hg) the amount of isobutanol which incorporates in the azeotrope, boiling point 85.5° C., is about 8.5 percent. The azeotrope of perchlorethylene with 9 percent cyclopentanol boils at about 118° C. As determined by the Tag open cup method, neither azeotrope exhibits a flash point, an obvious advantage when used in an industrial process since they may be safely used at any temperature. The azeotrope of perchlorethylene and ethylene glycol monoethyl ether incorporates about 17.1 percent of the latter and exhibits a boiling point of 116.1° C. and a flash point of 103° C. The perchlorethylene/n-amyl alcohol azeotrope, which boils at 117.6° C., contains 13.9 percent of the alcohol and shows a flash point of 112° C. From the foregoing it becomes obvious that the azeotropes can all be used safely at tempeartures well in excess of ambient. It will be understood that certain minor variations in boiling point and relative proportion of the components of the azeotrope will follow variations in atmospheric pressure, such changes being of negligible significance.

It is of course contemplated that the azeotropes may contain any of the conventional stabilizers employed in the art to prevent and/or deter the detrimental effects of decomposition of the trichloroethylene or perchloroethylene.

The manner of removal of the rosin-based solder flux from the soldered printed circuitry board is by contact with a liquid bath of the azeotropic mixture. It has been found, interestingly, that while an increase in length of time in which the board is in contact with the liquid will result in an increase in the amount of flux removed from the board, time is apparently no factor with respect to the removal of the objectionable film, said film apparently being composed of materials insoluble in non-polar solvents. The term "contacting" encompasses a variety of methods of bringing the boards and the azeotropic mixture together with some agitation at the board-liquid interface to facilitate removal of the flux. For example, the board may be immersed in the azeotropic liquid bath with mechanical agitation applied to the liquid as by stirring, air jets or subjection to ultrasonic vibration. On the other hand the board may be moved through an essentially quiescent liquid bath, the motion of the board supplying the desired agitation. Again, the azeotropes, particularly those containing isobutanol and cyclopentanol, can be employed in a vapor degreasing process wherein the boards are suspended over a heated bath of the azeotrope, the action of the vapors condensing on the surface doing the cleaning. Another method involves spraying the azeotrope, heated or not, directly onto the board. Other means will suggest themselves to those skilled in the art.

While the solvent action of the azeotrope is evidenced at room temperatures or below, in order to speed the cleaning action the bath may be operated at an elevated temperature, preferably less than boiling. Obviously, as more elevated temperatures are employed, as in vapor degreasing, means for recovery of solvent vapors become a necessity.

Following the removal of the board from contact with the liquid, it remains only to allow or cause the liquid to evaporated, a procedure which may be simply facilitated by use of a current of heated air.

In order that those skilled in the art may readily understand the present invention and certain specific embodiments by which it may be carried into effect, the following specific examples are afforded.

Example 1

To test the method of the present invention for removing flux material, glass slides were coated with the various commercially available rosin-based solder fluxes shown in Table I followed by baking in an oven for 7 minutes at a temperature of 180–195° C. Glass is employed for ease of visual observation of the results. The flux-coated slides are then placed in 4 oz. bottles filled with the indicated solvents and allowed to remain therein for 3 minutes. Agitation at the flux-liquid interface is provided by gentle shaking of the bottle. The results, in terms of the ability of the solvent to remove the flux without leaving a residue (film) on the surface of the slide, are reported in Table I.

TABLE I

| Solvent (weight percent) | Flux of— A | B | C | D | Total solvent performance |
|---|---|---|---|---|---|
| 91 perchlorethylene, 9 cyclopentanol | 0/0 | 1/0 | 0/0 | 0/0 | 1/0 |
| 82.9 perchlorethylene, 17.1 ethylene glycol, monoethyl ether | 0/0 | 1/0 | 1/0 | 0/0 | 2/0 |
| 91.5 trichlorethylene, 8.5 isobutanol | 0/0 | 0/0 | 0/0 | 0/1 | 0/1 |
| 89.4 perchlorethylene, 6.5 amyl acetate, 4.1 isobutyl acetate | 0/1 | 0/2 | 0/2 | 0/1 | 0/6 |
| 95 perchlorethylene, 5 amyl acetate | 0/1 | 0/2 0 | 0/2 | 0/1 | 0/6 |

NOTE:
Flux A=Kester 1571, trademark of Kester Solder Co. for an activated rosin-based solder flux; Flux B=Kester 1544, trademark of Kester Solder Co. for a highly activated rosin-based solder flux, Flux C=Alpha 711, trademark of Alpha Metals Co. for an activated rosin-based solder flux, Flux D=Gardiner GF-2000, trademark of Gardiner Solder Co. for a highly activated rosin-based solder flux. 0=Complete flux/film removal, 1=Trace of flux/film remains, 2=Very slight flux/film residue, 3=Slight flux/film residue, 4=Moderate flux/film residue.

From this table, especially the last column thereof, it can readily be seen that the azeotropic liquids of the present invention are superior to comparable solvents of the prior art insofar as their ability to remove the various commercially available solder fluxes, without leaving a film is concerned. As mentioned above, the ability of the solvent to remove the flux is normally a function of time and temperature whereas the capacity of the solvent to do so without leaving a film on the treated surface is independent of such considerations. Therefore the first number, reflecting ability to dissolve the flux, is of less significance than the second number, reflecting any remaining film.

Example 2

The procedure of Example 1 is followed employing the same fluxes and the solvents indicated.

TABLE II

| Solvent (weight percent) | Flux of— A | B | C | D | Total solvent performance |
|---|---|---|---|---|---|
| 91 perchlorethylene, 9 cyclopentanol | 0/0 | 1/1 | 1/1 | 0/0 | 2/2 |
| 82.9 perchlorethylene, 17.1 ethylene glycol monoethyl ether | 0/0 | 2/0 | 1/0 | 1/0 | 4/0 |
| 91.5 trichlorethylene, 8.5 isobutanol | 0/0 | 0/0 | 0/0 | 0/0 | 0/0 |
| Trichlorethylene | 0/0 | 0/1 | 0/1 | 0/0 | 0/2 |
| 89.4 perchlorethylene, 6.5 amyl acetate, 4.1 isobutyl acetate | 0/1 | 1/1 | 0/1 | 0/1 | 1/4 |
| 52 trichlorotrifluoroethane, 48 methylene chloride | 0/0 | 0/1 | 0/1 | 0/1 | 0/3 |
| 95 perchlorethylene, 5 amyl acetate | 0/2 | 0/1 | 1/1 | 0/1 | 1/5 |

NOTE.—See Table I footnote.

Again, the ability of the azeotropes of the present invention to remove the flux without leaving a film is illustrated. Any difference in the results obtained between Tables I, II and III (following) may be attributed to variations in the baking of the flux onto the slide. Therefore variations from one table to another are not necessarily comparative while results within each table are strictly comparative, the slides having been prepared together by the same method. It is further to be noted that while trichloroethylene alone appears satisfactory by comparison with the perchlorethylene/cyclopentanol azeotrope, since the solvent action of "pure" trichlorethylene is more severe than that of perchlorethylene, there are many instances where the former cannot be practically used without detriment to the board and/or certain components thereof.

Example 3

The procedure of Example 1 is again repeated with the following results.

TABLE III

| Solvent (weight percent) | Flux of— A | B | C | D | Total solvent performance |
|---|---|---|---|---|---|
| 82.9 perchlorethylene, 17.1 ethylene glycol monoethyl ether | 0/0 | 1/0 | 0/0 | 0/0 | 1/0 |
| 86.1 perchlorethylene, 13.9 amyl alcohol | 1/0 | 1/0 | 1/0 | 0/0 | 3/0 |
| 91.5 trichlorethylene, 8.5 isobutanol | 0/0 | 0/0 | 0/0 | 0/0 | 0/0 |
| 89.4 perchlorethylene, 6.5 amyl acetate, 4.1 isobutyl acetate | 0/1 | 0/1 | 0/1 | 0/1 | 0/4 |
| Perchlorethylene | 0/2 | 0/2 | 0/1 | 0/2 | 0/7 |
| Trichloroethylene | 0/1 | 0/1 | 0/1 | 0/1 | 0/4 |

NOTE.—See Table I footnote.

Again, the superiority of the method of the present invention employing the particular azeotropes is well established.

While the invention has been described with reference to certain specific and preferred embodiments thereof, it is not to be so limited since alterations and changes may be made therein which are within the full and intended scope of the appended claims.

I claim:

1. The method of removing rosin-based solder flux from soldered printed circuit boards, which method consists essentially of contacting said boards with an azeotropic mixture selected from the group consisting of about 91.5 percent trichlorethylene/8.5 percent isobutanol, about 91 percent perchlorethylene/9 percent cyclopentanol, about 82.9 percent perchlorethylene/17.1 percent ethylene glycol monoethyl ether and about 86.1 percent perchlorethylene/13.9 percent n-amyl alcohol, all percents by weight.

2. A method as in claim 1 wherein the mixture is heated to less than its boiling point.

3. A method as in claim 1 wherein the contact is carried out by imemrsion of the board in an agitated bath of the azeotropic mixture.

4. A method as in claim 3 wherein the bath is heated to less than its boiling point.

5. A method as in claim 1 wherein the contact is by immersion of the board in a bath of the azeotropic mixture accompanied by movement of the board within said bath.

6. A method as in claim 5 wherein the bath is heated to less than its boiling point.

7. A method as in claim 1 wherein contact is by directly spraying said azeotropic mixture onto said boards.

8. A method as in claim 7 wherein the mixture is heated to a temperature less than its boiling point prior to spraying.

9. A method as in claim 1 wherein the contact is carried out by condensation of the azeotropic mixture on said boards above a heated bath of said mixture.

References Cited

UNITED STATES PATENTS

| | | | |
|---|---|---|---|
| 2,662,837 | 12/1953 | Duncan | 134—38 X |
| 2,755,209 | 7/1956 | Duncan | 134—38 X |
| 3,338,756 | 8/1967 | Leon | 134—38 X |
| 3,400,077 | 9/1968 | Orfeo et al. | 252—171 |
| 3,554,918 | 1/1971 | Schofield et al. | 252—171 |
| 3,625,763 | 12/1971 | Mellillo | 134—38 |

MORRIS O. WOLK, Primary Examiner

T. HAGAN, Assistant Examiner

U.S. Cl. X.R.

134—11. 31, 40; 252—170, 171, 364